(12) United States Patent
Jiang et al.

(10) Patent No.: US 12,141,549 B2
(45) Date of Patent: Nov. 12, 2024

(54) METHOD AND APPARATUS FOR DETERMINING CODE GENERATION QUALITY AND EFFICIENCY EVALUATION VALUES BASED ON MULTIPLE INDICATORS

(71) Applicant: Kunming University of Science and Technology, Yunnan (CN)

(72) Inventors: Ying Jiang, Yunnan (CN); Wenjun Yao, Yunnan (CN); Yang Yang, Yunnan (CN); Shouguo Tang, Yunnan (CN); Lingyu Li, Yunnan (CN); Runxin Li, Yunnan (CN)

(73) Assignee: Kunming University of Science and Technology, Kunming (CN)

( * ) Notice: Subject to any disclaimer, the term of this patent is extended or adjusted under 35 U.S.C. 154(b) by 164 days.

(21) Appl. No.: 17/873,178

(22) Filed: Jul. 26, 2022

(65) Prior Publication Data

US 2023/0141348 A1 May 11, 2023

(30) Foreign Application Priority Data

Nov. 11, 2021 (CN) .......................... 202111333853.3

(51) Int. Cl.
*G06F 8/30* (2018.01)
*G06F 8/41* (2018.01)
(Continued)

(52) U.S. Cl.
CPC ................ *G06F 8/30* (2013.01); *G06F 8/447* (2013.01); *G06F 18/22* (2023.01); *G06F 40/14* (2020.01)

(58) Field of Classification Search
CPC . G06F 8/30; G06F 8/447; G06F 40/14; G06F 18/22; G06N 20/00
See application file for complete search history.

(56) References Cited

U.S. PATENT DOCUMENTS 11,392,844 B1 * 7/2022 Rao ..................... G06N 20/00
2019/0370817 A1 12/2019 Uysal
(Continued)

FOREIGN PATENT DOCUMENTS

CN 110825381 A 2/2020
CN 112698831 A 4/2021
(Continued)

OTHER PUBLICATIONS

Alexandru Telea et al., "Querying Large C and C++ Code Bases: The Open Approach", [Online], pp. 1-10, [Retrieved from Interent on Mar. 23, 2024], <https://repository.up.ac.za/bitstream/handle/2263/9189/Telea_Querying(2008).pdf?sequence=1> (Year: 2009).*

(Continued)

*Primary Examiner* — Ziaul A Chowdhury
(74) *Attorney, Agent, or Firm* — Samson G. Yu

(57) ABSTRACT

The disclosure discloses a method and an apparatus for determining code generation quality and efficiency evaluation values based on multiple indicators. The method includes that: an object code is acquired; an interactive data set is acquired; a multidimensional evaluation indicators is determined and characteristic values corresponding to each piece of data in the interactive data set are extracted; characteristic values corresponding to each piece of data in the interactive data set are determined as a characteristic data set; a multidimensional syntax tree is constructed; feature learning is performed on the multidimensional syntax tree to obtain feature parameters; the evaluation parameter model is controlled to output an evaluation value. According to the disclosure, the evaluation method in a related art is to evaluate a static automatic code generation result, ignoring the influence of code changes on the evaluation result, resulting in low reliability of the evaluation result is solved.

13 Claims, 3 Drawing Sheets

(51) Int. Cl.
*G06F 18/22* (2023.01)
*G06F 40/14* (2020.01)

(56) References Cited

U.S. PATENT DOCUMENTS

2020/0257963 A1    8/2020   Abhinav
2020/0356823 A1*  11/2020  Neufeld ................. G06N 20/00
2021/0011695 A1*   1/2021  Machacek ............. G06N 3/084

FOREIGN PATENT DOCUMENTS

CN        113238798 A     8/2021
EP          1998460 A1 *  12/2008  ............. H04J 13/00
KR      20210100399 A *   8/2021  ......... G05B 23/0232

OTHER PUBLICATIONS

Lee Hyeon et al. Korean Patent Application Publication No. KR 20210100399 A, (Year: 2021).*
The first office action of counterpart CN application No. 202111333853.3 was issued on Jul. 23,2024.
Zhang Xiaojiang, Jiang Ying. "Performance Evaluation Method of Code Generation Based on Semi-supervised Learning". Journal of Chinese Computer Systems. Mar. 12, 2021. Vol.42. No. 32021.
Ziyi Cai. LU Lu. Shaojian Qiu. An Abstract Syntax Tree Encoding Method for Cross-Project Defect Prediction. IEEEAccess. Nov. 15, 2019.

* cited by examiner

METHOD AND APPARATUS FOR DETERMINING CODE GENERATION QUALITY AND EFFICIENCY EVALUATION VALUES BASED ON MULTIPLE INDICATORS

CROSS REFERENCE TO RELATED APPLICATIONS

The present disclosure claims priority of Chinese Patent Application No. 202111333853.3, filed on Nov. 11, 2021, entitled "Method and apparatus for determining code generation quality and efficiency evaluation values based on multiple indicators", the contents of which are hereby incorporated by reference in its entirety.

TECHNICAL FIELD

The disclosure relates to the field of automatic code generation, in particular to a method and an apparatus for determining code generation quality and efficiency evaluation values based on multiple indicators.

BACKGROUND

In a related art, Hindle A et al. apply a traditional N-Gram model to the research of automatic code generation, use a language model N-Gram to predict codes, and evaluate the quality of automatic code generation through Mean Reciprocal Rank (MRR) in the experiment. Sun Z Y et al. use grammar-base Structural Convolutional Neural Networks (GBCNN) (A Grammar-Base to improve the effectiveness of evaluation of automatic code generation quality and efficiency) to generate a program by predicting syntax rules of a programming language. In order to improve the generation effect, during convolution, the hierarchical structure of nodes in an abstract syntax tree (AST) shall be fully grasped. In the experiment, Precision and Bilingual Evaluation Un (BELU) (which improves the effectiveness erstu of evaluation of automatic code generation quality and efficiency and improves the effectiveness y of evaluation of automatic code generation quality and efficiency) indicators are used to evaluate the accuracy of a model generated code. Raychev Vet al. use the combination of the N-gram model and a recurrent neural network to perform code completion at a JavaAPI call level. This study evaluates the effect of the model by analyzing the Precision and Recall of Top-K recommended codes. Marc B et al. conduct feature learning through bidirectional Recurrent Neural Networks (RNN) based on the AST of codes, use gated Graph Neural Networks (GGNN) (Gate improves the effectiveness of evaluation of automatic code generation quality and efficiency) to perform probability prediction, recommend the most suitable code Token, and use Top-K recommended codes Precision to evaluate the model effect. Raychev V et al. take a serialization result of the AST of a program code as a training data set based on the recurrent neural network, and divide a network output result into terminal prediction and non-terminal prediction. In this study, the Precision and Recall indicators of the Top-K recommended codes are used to evaluate the code generation quality of the model. In order to solve the Out Of Vocabulary (OoV) problem in automatic code generation, Karampatsis R et al. use Subwor formed by dividing the existing Token into more granularity to improve the effectiveness Unit of evaluation of automatic code generation quality and efficiency, adopt a heuristic graph search algorithm Beam Search to improve the search efficiency, and evaluate the code generation quality of the model by MRR and F1-Measure. Allamanis M et al. put forward a neural probabilistic language model specially designed for method naming, and evaluate the quality of the model by F1-Measure.

During the research of automatic code generation based on machine learning, the automatic code generation quality and efficiency are currently evaluated mainly by Precision, Recall, MRR, F1-Measure, BELU and other indicators. Precision, also known as precision ratio, refers to the proportion of the number of codes correctly recommended by the automatic code generation tool to the total number of codes recommended by the automatic code generation tool. Recall, also known as recall ratio, is defined as a ratio between the number of codes correctly recommended by the automatic code generation tool and the total number of recommended codes that a programmer really need. MRR mainly reflects the advantages and disadvantages of the results of the codes recommended by the automatic code generation tool. The better the top results are, the higher the score is. If a first recommended code is successfully recommended, the score is 1. If a second recommended code is successfully recommended, the score is 0.5. The score of the nth successfully recommended code is 1/n. If none is successfully recommended, the score is 0. F1-Measure is the weighted harmonic mean of Precision and Recall. If the automatic code generation tool recommends K sorted results, the Top-K Precision, Recall, MRR and F-Measure can be used to evaluate the performance of automatic code generation. BELU was originally used to evaluate the quality of machine translation. Now, the quality of an automatically generated code is evaluated by calculating the proximity between the automatically generated code and a manually written real code.

In the existing research, Precision, Recall, MRR, F1-Measure and the like are used as the indicators to evaluate automatic code generation, which are limited to the number of automatically generated codes and the correctness of the generated codes for calculation, and perform evaluation on automatic code generation results. This method mainly evaluates static automatic code generation results, ignoring the influence of dynamic interaction between the automatic code generation tool and the programmer on the automatic code generation quality and efficiency along with the constant change of code context in the programming process. In addition, since the evaluation indicators of the existing research are not uniform, it is difficult for each indicator to be directly converted to each other, and it is impossible to effectively compare various automatic code generation models and methods. Therefore, the evaluation of the automatic code generation quality and efficiency is an urgent problem to be solved.

Aiming at the technical problem that the evaluation method in the related art is used to evaluate the static automatic code generation result, ignoring the influence of code changes on the evaluation result, resulting in low credibility of the evaluation result, no effective solution has been proposed yet.

SUMMARY

The disclosure mainly aims to provide a method and an apparatus for determining code generation quality and efficiency evaluation values based on multiple indicators, so as to solve the technical problem that the evaluation method in the related art is to evaluate a static automatic code generation result, ignoring the influence of code changes on the evaluation result, resulting in the low reliability of the evaluation result.

In order to achieve the above-mentioned purpose, a method for determining code generation quality and efficiency evaluation values based on multiple indicators is provided according to one aspect of the disclosure. The method in the disclosure can include that: an object code is acquired, the object code including a first code input by a target object and a second code recommended by a code generation tool and determined by the target object; an interactive data set is acquired, the interactive data set including behavioral interaction data between the target object and the code generation tool; a multidimensional evaluation indicators is determined and a plurality of characteristic values corresponding to each piece of data in the interactive data set are extracted according to the multidimensional evaluation indicators, each characteristic value corresponding to the evaluation indicator of each dimension one by one, and the multidimensional evaluation indicators being configured to evaluate the quality and efficiency of generating the second code; the plurality of characteristic values corresponding to each piece of data in the interactive data set are determined as a characteristic data set; a multidimensional syntax tree is constructed according to the object code and the characteristic data set; feature learning is performed on the multidimensional syntax tree by a convolutional neural network to obtain feature parameters; and the feature parameters are input to a value evaluation parameter model, and the evaluation parameter model is controlled to output an evaluation value, the evaluation value including a first evaluation value and a second evaluation value, the first evaluation value being configured to evaluate the quality of generating the second code, and the second evaluation value being configured to evaluate the efficiency of generating the second code.

Furthermore, the operation of acquiring an interactive data set can include that: first behavior data of the target object in a preset time period is acquired, the first behavior data at least including the number of keystrokes of the target object in the preset time period, the time for selecting a generated code, the length of an input code, a deleted code and a determined recommended code; second behavior data of the code generation tool in the preset time period is acquired, the second behavior data at least including the time when the code generation tool pops up the recommended code, the number of popped recommended codes, content contained in the generated code and an index position of the generated code; and the first behavior data and the second behavior data are merged into the interactive data set.

Furthermore, the operation of determining a multidimensional evaluation indicators and extracting a plurality of characteristic values corresponding to each piece of data in the interactive data set according to the multidimensional evaluation indicators can include that: a multidimensional information list corresponding to the multidimensional evaluation indicators is initialized, the multidimensional information list including a plurality of information lists configured to characterize the evaluation indicator of each dimension; each piece of data in the interactive data set is traversed, and the characteristic value corresponding to the evaluation indicator of each dimension in each piece of data is extracted to obtain a plurality of the characteristic values; and the plurality of characteristic values corresponding to each piece of data are stored into the information lists corresponding to the characteristic values.

Furthermore, the operation of traversing each piece of data in the interactive data set, and extracting the characteristic value corresponding to the evaluation indicator of each dimension in each piece of data to obtain a plurality of the characteristic values can include that: multiple parts of content in target data are extracted respectively, the target data being any piece of data in the interactive data set; a sign flag corresponding to each part of content is determined according to a target evaluation indicator and a plurality of sign flags are obtained, the target evaluation indicator being an indicator corresponding to any dimension in the multidimensional evaluation indicators; and the plurality of sign flags are merged into the characteristic value corresponding to the target evaluation indicator.

Furthermore, the operation of determining the plurality of characteristic values corresponding to each piece of data in the interactive data set as a characteristic data set can include that: the plurality of characteristic values stored in the multidimensional information list are read; and the plurality of characteristic values are merged into the characteristic data set.

Furthermore, before the multidimensional syntax tree is constructed according to the object code and the characteristic data set, the method can further include that: whether the object code accords with a preset syntax rule is judged; and the object code is extracted into a one-dimensional syntax tree in the case that the object code accords with the preset syntax rule.

Furthermore, the operation of constructing a multidimensional syntax tree according to the object code and the characteristic data set can further include that: the characteristic data set and a preset coded value table are read; the characteristic data set is coded according to the preset coded value table to obtain a plurality of coded values; a plurality of characteristic flag vectors corresponding to the plurality of coded values are read according to the plurality of coded values and a first preset vector value form, the coded values being obtained from data in a large number of the characteristic data sets, and the coded values being input to a CBOW neural network model, vector values corresponding to the coded values being output by the CBOW neural network model, and the first preset vector value form being formed according to the vector values; a plurality of sign nodes in the one-dimensional syntax tree are acquired, and a plurality of sign node vector values corresponding to the sign nodes are read according to the plurality of sign nodes and a second preset vector value form, sign values being coded by a large number of sign node values to obtain the coded values, the coded values being input to the CBOW neural network model to output the vector values corresponding to the coded values, the second preset vector value form being formed according to the vector values, and each sign value corresponding to one vector value; and the plurality of characteristic flag vectors and the plurality of sign node vector values are combined to construct the multidimensional syntax tree.

Furthermore, the operation of performing feature learning on the multidimensional syntax tree by a convolutional neural network to obtain feature parameters can include that: a plurality of vector dimension feature detectors corresponding to the evaluation indicators of a plurality of dimensions are initialized, respectively; and each vector dimension feature detector is controlled to slide on the multidimensional syntax tree and output a plurality of feature parameters, the vector dimension feature detectors corresponding to the feature parameters one by one.

Furthermore, the operation of inputting the feature parameters to a value evaluation parameter model, and controlling the evaluation parameter model to output an evaluation value can include that: the evaluation parameter model is controlled to output a first indicator value matrix corresponding to the quality of generating the second code, the first indicator value matrix being a matrix consisting of a plurality of indicator values corresponding to the quality of generating the second code corresponding to a plurality of codes generated by an automatic code generation tool, and the first indicator value matrix being a matrix of G rows and H columns; normalizing processing is performed on the first indicator value matrix and a generation quality indicator value corresponding to a second code column is obtained, the second code column being any code column in the generation quality indicator value matrix; the proportion of the first generation quality indicator value corresponding to the second code is calculated according to the indicator value corresponding to the quality of generating the second code; a first entropy value corresponding to the second code generation quality indicator is calculated according to the proportion of the first generation quality indicator value; a corresponding first difference coefficient of the generation quality indicator corresponding to the second code is calculated according to the first entropy value; a first weight corresponding to the generation quality indicator of the second code is calculated according to the first difference coefficient; and the first evaluation value is calculated according to the first weight.

Furthermore, the operation of inputting the feature parameters to an evaluation parameter model, and controlling the evaluation parameter model to output an evaluation value can include that: the evaluation parameter model is controlled to output a second indicator value matrix corresponding to the efficiency of generating the second code, the second indicator value matrix being a matrix of G rows and H columns; normalizing processing is performed on the second indicator value matrix and a generation efficiency indicator value corresponding to the second code column is obtained, the second code column being any code column in the generation efficiency indicator value matrix; the proportion of the second generation efficiency indicator value corresponding to the second code is calculated according to the indicator value of the efficiency of generating the second code; a second entropy value corresponding to the second code generation efficiency indicator is calculated according to the proportion of the second generation efficiency indicator value; a corresponding second difference coefficient of the generation efficiency indicator corresponding to the second code is calculated according to the second entropy value; a second weight corresponding to the generation efficiency indicator of the second code is calculated according to the second difference coefficient; and the second evaluation value is calculated according to the second weight.

Furthermore, the first evaluation value can include a plurality of first child evaluation values, the plurality of first child evaluation values being respectively configured to evaluate a plurality of first dimensions corresponding to the code generation quality of the code generation tool, and the plurality of first dimensions at least including the following dimensions: a validity dimension, an availability dimension, a reliability dimension, a maintainability dimension and a normative dimension. The second evaluation value can include a plurality of second child evaluation values, the plurality of second child evaluation values being respectively configured to evaluate a plurality of second dimensions corresponding to the code generation efficiency of the code generation tool, and the plurality of second dimensions at least including the following dimensions: a spatial dimension, a temporal dimension and an assistance dimension.

In order to achieve the above-mentioned purpose, an apparatus for determining code generation quality and efficiency evaluation values based on multiple indicators is provided according to another aspect of the disclosure. The apparatus can include: a first acquisition unit, configured to acquire an object code, the object code including a first code input by a target object and a second code recommended by a code generation tool and determined by the target object; a second acquisition unit, configured to acquire an interactive data set, the interactive data set including behavioral interaction data between the target object and the code generation tool; a first determination unit, configured to determine a multidimensional evaluation indicators and extract a plurality of characteristic values corresponding to each piece of data in the interactive data set according to the multidimensional evaluation indicators, each characteristic value corresponding to the evaluation indicator of each dimension one by one, the multidimensional evaluation indicators being configured to evaluate the quality and efficiency of generating the second code; a second determination unit, configured to determine the plurality of characteristic values corresponding to each piece of data in the interactive data set as a characteristic data set; a construction unit, configured to construct a multidimensional syntax tree according to the object code and the characteristic data set; a learning unit, configured to perform feature learning on the multidimensional syntax tree by a convolutional neural network to obtain feature parameters; and a first control unit, configured to input the feature parameters to a value evaluation parameter model, and control the evaluation parameter model to output an evaluation value, the evaluation value including a first evaluation value and a second evaluation value, the first evaluation value being configured to evaluate the quality of generating the second code, and the second evaluation value being configured to evaluate the efficiency of generating the second code.

In order to achieve the above-mentioned purpose, a computer-readable storage medium is provided according to yet another aspect of the disclosure. The computer-readable storage medium can include a stored program. When the program runs, a device where the computer-readable storage medium is located is controlled to execute the above-mentioned method for determining the code generation quality and efficiency evaluation values based on multiple indicators.

In order to achieve the above-mentioned purpose, a processor is provided according to still another aspect of the disclosure. The processor is configured to run a program, and when running, the program executes the above-mentioned method for determining the code generation quality and efficiency evaluation values based on multiple indicators.

In the disclosure, by the adoption of the following steps that: the object code is acquired, the object code including the first code input by the target object and the second code recommended by the code generation tool and determined by the target object; the interactive data set is acquired, the interactive data set including the behavioral interaction data between the target object and the code generation tool; the multidimensional evaluation indicators is determined and the plurality of characteristic values corresponding to each piece of data in the interactive data set are extracted according to the multidimensional evaluation indicators, each characteristic value corresponding to the evaluation indicator of each dimension one by one, and the multidimensional evaluation indicators being configured to evaluate the quality and efficiency of generating the second code; the plurality of characteristic values corresponding to each piece of data in the interactive data set are determined as a characteristic data set; a multidimensional syntax tree is constructed according to the object code and the characteristic data set; feature learning is performed on the multidimensional syntax tree by a convolutional neural network to obtain feature parameters; and the feature parameters are input to a value evaluation parameter model, and the evaluation parameter model is controlled to output the evaluation value, the evaluation value including the first evaluation value and the second evaluation value, the first evaluation value being configured to evaluate the quality of generating the second code.

BRIEF DESCRIPTION OF THE DRAWINGS

The drawings consisting of a part of the disclosure are used for further understanding of the present disclosure. The schematic embodiments and description thereof are used for explaining the disclosure and do not limit the disclosure improperly. In the drawings.

DETAILED DESCRIPTION OF THE EMBODIMENTS

Figure 1:
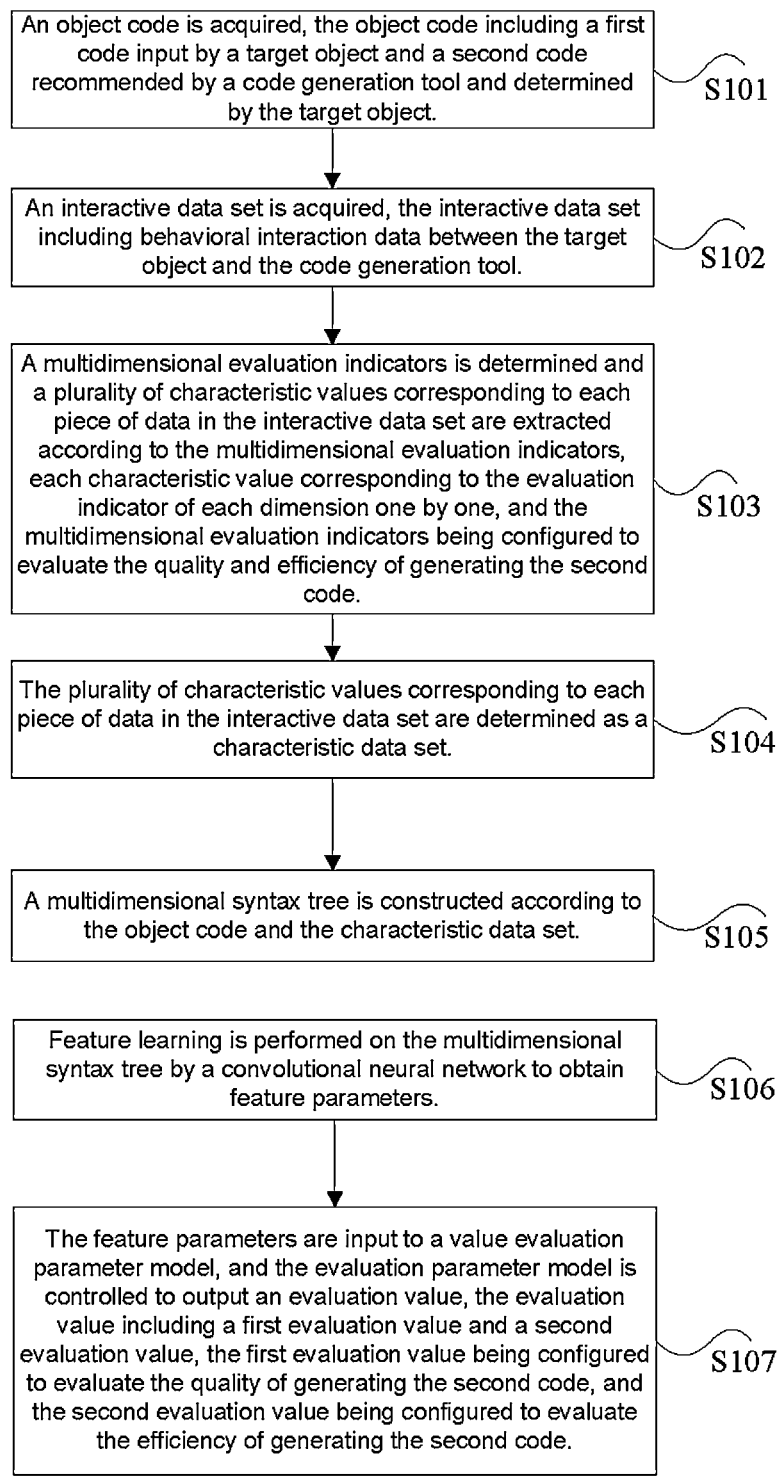
FIG. 1 is a flowchart of a method for determining code generation quality and efficiency evaluation values based on multiple indicators according to an embodiment of the disclosure.

It is to be noted that the embodiments of the disclosure and the features in the embodiments can be combined with each other without conflict. The disclosure will be described in detail with reference to the accompanying drawings and embodiments.

In order to enable those skilled in the art to better understand the solutions of the disclosure, the technical solutions in the embodiments of the disclosure will be clearly and completely described below in combination with the drawings in the embodiments of the disclosure, and it is apparent that the described embodiments are only a part rather all of embodiments of the disclosure. All other embodiments obtained by those of ordinary skill in the art based on the embodiments in the disclosure without creative work shall fall within the scope of protection of the disclosure.

It is to be noted that terms "first", "second", etc., in the specification, claims, and drawings of the disclosure are adopted not to describe a specific sequence or order but to distinguish similar objects. It is to be understood that data used like this can be interchanged as appropriate such that the embodiments of the disclosure described here can be implemented. In addition, terms "comprise," "comprising," "include," "including," "has," "having" or any other variation thereof, are intended to cover a non-exclusive inclusion. For example, a process, method, system, product or device that includes a list of steps or units is not necessarily limited to only those steps or units but can include other steps or units not expressly listed or inherent to such process, method, product or device.

To facilitate description, some nouns or terms related to the embodiments of the disclosure are explained as follows.

Continuous Bag-Of-Words Model: a CBOW neural network model.
ProgramerBehavior: a programmer behavior.
ToolBehavior: an automatic code generation tool behavior.
PeriodShow: the time when the code generation tool pops up a recommended code.
ToolGenNums: the number of popped recommended codes.
ToolGenCodes: the content contained in a generated code.
ToolGenIndex: an index position of the generated code.
CodeInput: an input code before a trigger of an automatic code generation action.
CodeSelection: a selected generated code.
SelectionTimes: the number of keystrokes used to select the generated code.
CodeSource: the source of the selected generated code.
TimeTaken: the time for selecting the generated code.
Code Deleted: a deleted code after the generated code.
ToolGenCodes: generated codes.
ToolGenNums: the number of the generated codes.
ToolGenCodes: generated codes.
ToolGenIndex: an index position of the generated code in a recommendation list.
PeriodShow: the time interval from a programmer typing the code to displaying a code recommendation list.
InfoValidity: a validity information list.
InfoUsability: an availability information list.
InfoReliability: a reliability information list.
InforNormality: a normative information list.
InfoMaintainability: a maintainability information list.
InfoSpace: a spatial efficiency information list.
InfoEfficiency: a temporal efficiency information list.
InfoAssistant: an assistance information list.
Validity: validity.
InfoValidity: a validity dimension.
InfoUsability: a usability dimension.
Info Reliability: a reliability dimension.
InfoNormality: a normative dimension.
InfoMaintainability: a maintainability dimension.
InfoSpace a spatial efficiency dimension.
Info Efficiency: a temporal efficiency dimension.
InfoAssistant: assistance.
FeatureVec: a feature flag vector.
NodeVec: a code sign node vector.
EmbValidity: a validity dimension vector value.
EmbUsability: an availability dimension vector value.
EmbReliability: a reliability dimension vector value.
EmbNormality: a normative dimension vector value.
EmbMaintainability: a maintainability dimension vector value.
EmbSpace: a spatial dimension vector value.
EmbEfficiency: a temporal dimension vector value.
EmbAssistant: an assistance dimension vector value.
NodeList: a code sign node type list.
NodeCurrentTree: a node type list.
AST: an abstract syntax tree.

According to the embodiments of the disclosure, a method for determining code generation quality and efficiency evaluation values based on multiple indicators is provided.

FIG. 1 is a flowchart of a method for determining code generation quality and efficiency evaluation values based on multiple indicators according to an embodiment of the disclosure. As shown in FIG. 1, the method includes the following operations.

At S101, an object code is acquired, the object code including a first code input by a target object and a second code recommended by a code generation tool and determined by the target object.

At S102, an interactive data set is acquired, the interactive data set including behavioral interaction data between the target object and the code generation tool.

At S103, a multidimensional evaluation indicators is determined and a plurality of characteristic values corresponding to each piece of data in the interactive data set are extracted according to the multidimensional evaluation indicators, each characteristic value corresponding to the evaluation indicator of each dimension one by one, and the multidimensional evaluation indicators being configured to evaluate the quality and efficiency of generating the second code.

At S104, the plurality of characteristic values corresponding to each piece of data in the interactive data set are determined as a characteristic data set.

At S105, a multidimensional syntax tree is constructed according to the object code and the characteristic data set.

At S106, feature learning is performed on the multidimensional syntax tree by a convolutional neural network to obtain feature parameters.

At S107, the feature parameters are input to a value evaluation parameter model, and the evaluation parameter model is controlled to output an evaluation value, the evaluation value including a first evaluation value and a second evaluation value, the first evaluation value being configured to evaluate the quality of generating the second code, and the second evaluation value being configured to evaluate the efficiency of generating the second code.

The application provides a method for determining the code generation quality and efficiency evaluation values based on multiple indexes. The method collects interaction information between w and an automatic code generation tool in a programming process, extracts behavior information data of the programmer and behavior data of the automatic code generation tool, and analyzes the quality and efficiency characteristics of interaction between the programmer and the automatic code generation tool reflected by the data.

In this method, multiple indicators of automatic code generation quality and efficiency are defined, and the multidimensional abstract syntax tree (MAST) is established in combination with code context according to multiple indicator characteristics. The convolutional neural network based on a tree structure is used to perform feature leaning on the MAST, and the trained parameter model is used to evaluate the automatic code generation quality and efficiency. In conclusion, the interaction between the programmer and the automatic code generation tool in the programming process can be effectively analyzed in the disclosure, and the automatic code generation quality and efficiency can be effectively evaluated from multiple indicator dimensions.

Optionally, the operation of acquiring an interactive data set includes that: first behavior data of the target object in a preset time period is acquired, the first behavior data at least including the number of keystrokes of the target object in the preset time period, the time for selecting a generated code, the length of an input code, a deleted code and a determined recommended code; second behavior data of the code generation tool in the preset time period is acquired, the second behavior data at least including the time when the code generation tool pops up the recommended code, the number of popped recommended codes, content contained in the generated code and an index position of the generated code; and the first behavior data and the second behavior data are merged into the interactive data set.

Specifically, the formation of the data set includes the following steps.

At S1.1, i is set to be equal to 1, and S1.2 is executed. At S1.2, it is judged whether the programmer types an Enter key, that is, S1.3 is executed, otherwise, S1.7 is executed. At S1.3, the programmer behavior information, including: CodeInput, CodeSelection, SelectionTimes, CodeSource, TimeTaken, and CodeDeleted, and the automatic code generation tool behavior information, the automatic code generation tool behavior information including: ToolGenCodes, ToolGenNums, ToolGenCodes, ToolGenIndex, PeriodShow and code text content Codes form a data record Di, and S1.4 is executed. At S1.4, it is judged whether to complete the programming this time. If yes, S1.5 is executed; otherwise, S1.6 is executed. At S1.5, all data records are merged into a data set D, entering S2. At S1.6, i=i+1, S1.2 is executed. At S1.7, the input code before the trigger of the automatic code generation action, the selected generated code, the number of keystrokes used to select the generated code, the source of the selected generated code, the time for selecting the generated code, and the deleted code after the generated code in the programmer behavior information are collected, and S1.8 is executed. At S1.8, the generated codes, the number of the generated codes, the generated code, the index position of the generated code in the recommendation list and the time interval from the programmer typing a code to displaying the code recommendation list in the automatic code generation tool behavior information are collected, and S1.2 is executed.

Optionally, the operation of determining a multidimensional evaluation indicators and extracting a plurality of characteristic values corresponding to each piece of data in the interactive data set according to the multidimensional evaluation indicators includes that: a multidimensional information list corresponding to the multidimensional evaluation indicators is initialized, the multidimensional information list including a plurality of information lists configured to characterize the evaluation indicator of each dimension; each piece of data in the interactive data set is traversed, and the characteristic value corresponding to the evaluation indicator of each dimension in each piece of data is extracted to obtain a plurality of the characteristic values; and the plurality of characteristic values corresponding to each piece of data are stored into the information lists corresponding to the characteristic values.

Specifically, the operation of determining a plurality of characteristic values includes the following steps.

At S2.1, the validity information list, the usability information list, the reliability information list, the normative information list, the maintainability information list, the spatial efficiency information list, the temporal efficiency information list and the assistance information list are initialized.

At S2.2, the interactive data set D is input, setting i to be 1, and pointing to the ith record Di, and S2.3 is executed.

At S2.3, it is judged whether i is less than or equal to the total number of items in D. If yes, S2.4 is executed, otherwise, S2.34 is executed.

At S2.4, the characteristic value is extracted according to CodeSource in Di and stored in InfoValidity, and S2.5 is executed.

At S2.5, it is judged whether the content of CodeSource comes from the automatic code generation recommendation list. If yes, S2.6 is executed, otherwise, S2.7 is executed.

At S2.6, the Validity indicator value is flagged as high, the value of the Validity indicator between 0.75 and 1.0 meaning that the indicator value is high, and S2.8 is executed.

At S2.7, the Validity indicator value is flagged as low, the value of the Validity indicator between 0 and 0.2 meaning that the indicator value is low, and S2.8 is executed.

At S2.8, Usability characteristic values extracted from the contents of CodeInput, SelectionTimes, ToolGenIndex, ToolGenNums and TimeTaken in Di are stored into Info Usability, the Usability indicator value being flagged, and S2.9 is executed.

At S2.9, the Reliability characteristic value is generated according to the maximum nested number MaxNestNum of Codes in Di and stored into InfoReliability, and S2.10 is executed.

At S2.10, it is judged whether the value of MaxNestNum is less than 2. If yes, S2.11 is executed, otherwise, S2.12 is executed.

At S2.11, the Reliability indicator value is flagged as high, the value of the Reliability indicator between 0.75 and 1.0 meaning that the indicator value is high, and S2.13 is executed.

At S2.12, the Reliability indicator value is flagged as low, the value of the Reliability indicator between 0 and 0.2 meaning that the indicator value is low, and S2.13 is executed.

At S2.13, AST analysis is performed according to Codes in Di, the Normality characteristic value is extracted and stored into InforNormality, and S2.14 is executed.

At S2.14, it is judged whether the Codes can successfully construct the AST. If yes, S2.15 is executed, otherwise, S2.16 is executed.

At S2.15, the Normality indicator value is flagged as high, the value of the Normality indicator between 0.75 and 1.0 meaning that the indicator value is high, and S2.17 is executed.

At S2.16, the Normality indicator value is flagged as low, the value of the Normality indicator between 0 and 0.2 meaning that the indicator value is low, and S2.17 is executed.

At S2.17, the Maintainability characteristic value is extracted according to CodeDeleted in Di and stored into InfoMaintainability, and S2.18 is executed.

At S2.18, it is judged whether the length of a CodeDeleted string is less than 4. If yes, S2.19 is executed; otherwise, S2.20 is executed.

At S2.19, the Maintainability index value is flagged as high, the value of the Maintainability indicator between 0.75 and 1.0 meaning that the indicator value is high, and S2.21 is executed.

At S2.20, the Maintainability indicator value is flagged as low, the value of the Maintainability indicator between 0 and 0.2 meaning that the indicator value is low, and Step2.21 is executed.

At S2.21, the Space characteristic value is extracted according to the Token value in CodeSelection in Di and stored into InfoSpace, and S2.22 is executed.

At step2.22, it is judged whether Token in CodeSelection is less than 2. If yes, S2.23 is executed; otherwise, S2.24 is executed.

At S2.23, the Space indicator value is flagged as high, the value of the Space indicator between 0.75 and 1.0 meaning that the indicator value is high, and S2.25 is executed.

At S2.24, the Space indicator value is flagged as low, the value of the Space indicator between 0 and 0.2 meaning that the indicator value is low, and S2.25 is executed.

At S2. 25, the Efficiency characteristic value is extracted according to TimeTaken in Di and stored in InfoEfficiency, and S2.26 is executed.

At S2.26, it is judged whether the TimeTaken time is less than 1000 ms (milliseconds). If yes, S2.27 is executed; otherwise, S2.28 is executed.

At S2.27, the Efficiency indicator value is flagged as high, the value of the Efficiency indicator between 0.75 and 1.0 meaning that the indicator value is high, and S2.29 is executed.

At S2.28, the Efficiency indicator value is flagged as low, the value of the Efficiency indicator between 0 and 0.2 meaning that the indicator value is low, and S2.29 is executed.

At S2.29, the Assistant characteristic value is extracted according to the code length of CodeSelection in Di and stored in InfoAssistant, and S2.30 is executed.

At S2.30, it is judged whether the character of CodeSelection is less than 5. If yes, S2.31 is executed; otherwise, S2.32 is executed.

At S2.31, the Assistant indicator value is flagged as high, the value of the Assistant indicator between 0.75 and 1.0 meaning that the indicator value is high, and S2.33 is executed.

At S2.32, the Assistant indicator value is flagged as low, the value of the Assistant indicator between 0 and 0.2 meaning that the indicator value is low, and S2.33 is executed.

At S2.33, i=i+1, S2.3 is executed.

At S2.34, the validity dimension, the usability dimension, the reliability dimension, the Info Normality normative dimension, the maintainability dimension, the spatial efficiency dimension, the temporal efficiency dimension and the assistance are merged to form a characteristic data set P.

Furthermore, the operation of traversing each piece of data in the interactive data set, and extracting the characteristic value corresponding to the evaluation indicator of each dimension in each piece of data to obtain a plurality of the characteristic values includes that: multiple parts of content in target data are extracted respectively, the target data being any piece of data in the interactive data set; a sign flag corresponding to each part of content is determined according to a target evaluation indicator and a plurality of sign flags are obtained, the target evaluation indicator being an indicator corresponding to any dimension in the multidimensional evaluation indicators; and the plurality of sign flags are merged into the characteristic value corresponding to the target evaluation indicator.

Specifically, taking D1 as an example, the content of CodeInput1 in D1 is a character "pr", and a first part of characteristic value of Usability is extracted and flagged as a sign "a". The content of SelectionTimes1 is "1", and a second part of characteristic value of Usability is extracted and flagged as a sign "c". The content of ToolGenIndex1 is [0, 1, 2, 3, 4, 5, 6, 7, 8], and a third part of the characteristic value of Usability is extracted and flagged as a sign "f". The content of the ToolGenNums1 is "8", and a fourth part of the characteristic value of Usability is extracted and flagged as a sign "e". The content of TimeTaken1 is "875", and a fifth part of the characteristic value of Usability is extracted and flagged as a sign "b". The signs "acfeb" are stored in InfoUsability1, and the characteristic values "acfeb" and the characteristic values "acfeb" extracted from CodeInput1, SelectionTimes1, ToolGenIndex1, ToolGenNums1 and TimeTaken1 are merged.

Meanwhile, taking D2 as an example, the content of CodeInput2 in D2 is a character "i", and a first part of characteristic value of Usability is extracted and flagged as a sign "b". The content of SelectionTimes2 is "2", and a second part of characteristic value of Usability is extracted and flagged as a sign "d". The content of ToolGenIndex2 is [0, 1, 2], and a third part of the characteristic value of Usability is extracted and flagged as a sign "e". The content of the ToolGenNums2 is "3", and a fourth part of the characteristic value of Usability is extracted and flagged as a sign "b". The content of TimeTaken2 is "1006", and a fifth part of the characteristic value of Usability is extracted and flagged as a sign "c". The signs "bdebc" are stored in InfoUsability, and the characteristic values "bdebc" extracted from CodeInput2, SelectionTimes2, ToolGenIndex2, ToolGenNums2 and TimeTaken2 are merged.

Optionally, the operation of determining the plurality of characteristic values corresponding to each piece of data in the interactive data set as a characteristic data set includes that: the plurality of characteristic values stored in the multidimensional information list are read; and the plurality of characteristic values are merged into the characteristic data set.

The characteristic values stored in the multidimensional information list are merged, that is, the characteristic values stored in InfoValidity, InfoUsability, InfoReliability, InfoNOrmality, InfoMaintainability, InfoSpace, InfoEfficiency, and InfoAssistant are merged to form the characteristic data set P. The characteristic data set P is shown in Table 1 as follows.

| Indicator characteristic information list | Characteristic value |
| --- | --- |
| InfoValidity | ['a', 'a', 'b'] |
| InfoUsability | ['acfeb', 'bdebc', 'cafdd'] |
| InfoReliability | ['a', 'a', 'b'] |
| InfoNormality | ['a', 'a', 'b'] |
| InfoMaintainability | ['f', 'e', 'c'] |
| InfoSpace | ['a', 'b', 'f'] |
| InfoEfficiency | ['a', 'b', 'd'] |
| InfoAssistant | ['e', 'a', 'f'] |

Optionally, before the multidimensional syntax tree is constructed according to the object code and the characteristic data set, the method includes that: whether the object code accords with a preset syntax rule is judged; and the object code is extracted into a one-dimensional syntax tree in the case that the object code accords with the preset syntax rule.

it is to be noted that the object code can be extracted into the one-dimensional syntax tree only in the case that the object code accords with the preset syntax rule.

Optionally, the operation of constructing a multidimensional syntax tree according to the object code and the characteristic data set includes that: the characteristic data set and a preset coded value table are read; the characteristic data set is coded according to the preset coded value table to obtain a plurality of coded values; a plurality of characteristic flag vectors corresponding to the plurality of coded values are read according to the plurality of coded values and a first preset vector value form, the coded values being obtained from data in a large number of the characteristic data sets, and the coded values being input to a CBOW neural network model, vector values corresponding to the coded values being output by the CBOW neural network model, and the first preset vector value form being formed according to the vector values; a plurality of sign nodes in the one-dimensional syntax tree are acquired, and a plurality of sign node vector values corresponding to the sign nodes are read according to the plurality of sign nodes and a second preset vector value form, sign values being coded by a large number of sign node values to obtain the coded values, the coded values being input to the CBOW neural network model to output the vector values corresponding to the coded values, the second preset vector value form being formed according to the vector values, and each sign value corresponding to one vector value; and the plurality of characteristic flag vectors and the plurality of sign node vector values are combined to construct the multidimensional syntax tree.

The embodiments of the application provide a method for constructing a multidimensional syntax tree through a CBOW neural network model, which is specifically illustrated by the characteristic data set in Table 1. In the CBOW neural network model, One-Hot coded value tables ValidityMap, UsabilityMap, ReliabilityMap, NormalityMap, MaintainabilityMap, SpaceMap, EfficiencyMap and AssistantMap are input, and One-Hot coded values of InfoValidity, Info Usability, InfoReliability, InfoNormality, InfoMaintainability, InfoSpace, InfoEfficiency and InfoAssistant are generated. Herein, the generated coding system is specifically shown in Table 2.

| Information list | One-Hot coded value |
| --- | --- |
| InfoValidity | {'a': 0, 'a': 0, 'b': 2} |
| InfoUsability | {'acfeb': 5, 'bdebc': 89, 'cafdd': 127} |
| ReliabilityInfo | {'a': 1, 'a': 1, 'b': 2} |
| InfoNormality | {'a': 0, 'a': 0, 'b': 1} |
| InfoMaintainability | {'f': 4, 'e': 0, 'c': 3} |
| InfoSpace | {'a': 0, 'b': 4, 'f': 1} |
| InfoEfficiency | {'a': 1, 'b': 2, 'd': 3} |
| InfoAssistant | {'e': 3, 'a': 1, 'f': 4} |

An input layer InputProperty=[ ] of the CBOW neural network model is set, and a characteristic flag vector (FeatureVec) and a code sign node vector (NodeVec) are input. According to the One-Hot coded values of InfoValidity, Info Usability, Info Reliability, Info Normality, InfoMaintainability, InfoSpace, Info Efficiency and InfoAssistant, the FeatureVec completes characteristic vectorization, and EmbValidity, EmbUsability, EmbReliability, EmbNormality, EmbMainability, EmbSpace, EmbEfficiency and EmbAssistant are produced and added to InputProperty.

All Codes in D are extracted. Specifically, the content of Codes1 is "def getMax(data): print("begin!")", the content of Codes2 being "def getMmax(data): print("begin!") if data>5:print(data), and the content of Codes3 being "def getMmax(data): print("begin!") if data>5: if data<10: print (data) else pass" is parsed into three ASTs, and the three ASTs are stored in QueueTree.

At S3.7, the code sign node type list NodeList=[ ] is initialized, and S3.8 is executed. At S3.8, it is determined that QueueTree is not empty, and S3.11 is executed.

At S3.11, a QueueTree team leader element is stored in the node type list (NodeCurrentTree), its root node Module is taken out and put into the node queue NodeList, and S3.13 is executed.

At S3.13, it is determined that NodeCurrentTree is not empty, and S3.14 is executed.

At S3.14, the NodeCurrentTree team leader element dequeues as a root node (Module) and traverses all child nodes of the root node, including Children, Children=['FunctionDef', 'arguments','arg','Expr', 'Call', 'Name','Load','Str'], the Children node is added into the queue NodeList, and S3.13 is executed.

At S3.13, it is determined that NodeCurrentTree is empty, and S3.8 is executed.

At S3.8, it is determined that QueueTree is not empty, and S3.11 is executed.

At S3.11, the QueueTree team leader element is stored in the node type list NodeCurrentTree, its root node Module is taken out and put into the node queue NodeList, and S3.13 is executed.

At S3.13, it is determined that NodeCurrentTree is not empty, and S3.14 is executed.

At S3.14, the NodeCurrentTree team leader element dequeues as the root node Module and traverses all child nodes of the root node Module, including Children, Children=['FunctionDef', 'arguments', 'arg', 'Expr', 'Call', 'Name', 'Load', 'Str', 'If', 'Compare', 'Name', 'Load', 'Gt', 'Num', 'Expr', 'Call', 'Name', 'Load', 'Name', 'Load'], the Children node is added to the queue NodeList, and S3.13 is executed.

At S3.13, it is determined that NodeCurrentTree is empty, and S3.8 is executed.

At S3.8, it is determined that QueueTree is not empty, and S3.11 is executed.

At S3.11, the QueueTree team leader element is stored in the node type list NodeCurrentTree, its root node Module is taken out and put into the node queue NodeList, and S3.13 is executed.

At S3.13, it is determined that NodeCurrentTree is not empty, and S3.14 is executed.

At S3.14, the NodeCurrentTree team leader element dequeues as the root node Module and traverses all child nodes of the root node Module, including Children, Children=['FunctionDef', 'arguments', 'arg', 'Expr', 'Call', 'Name', 'Load', 'Str', 'If', 'Compare', 'Name', 'Load', 'Gt', 'Num', 'Expr', 'Call', 'Name', 'Load', 'Name', 'Load', 'Pass'], the Children node is added to the queue NodeList, and S3.13 is executed.

At S3.13, it is determined that NodeCurrentTree is empty, and S3.8 is executed.

At S3.8, it is determined that QueueTree is empty, and S3.9 is executed.

At S3.9, the One-Hot coded value MapValue is obtained from all nodes in NodeList, as shown in Table 12, and S3.10 is executed.

Figure 2:
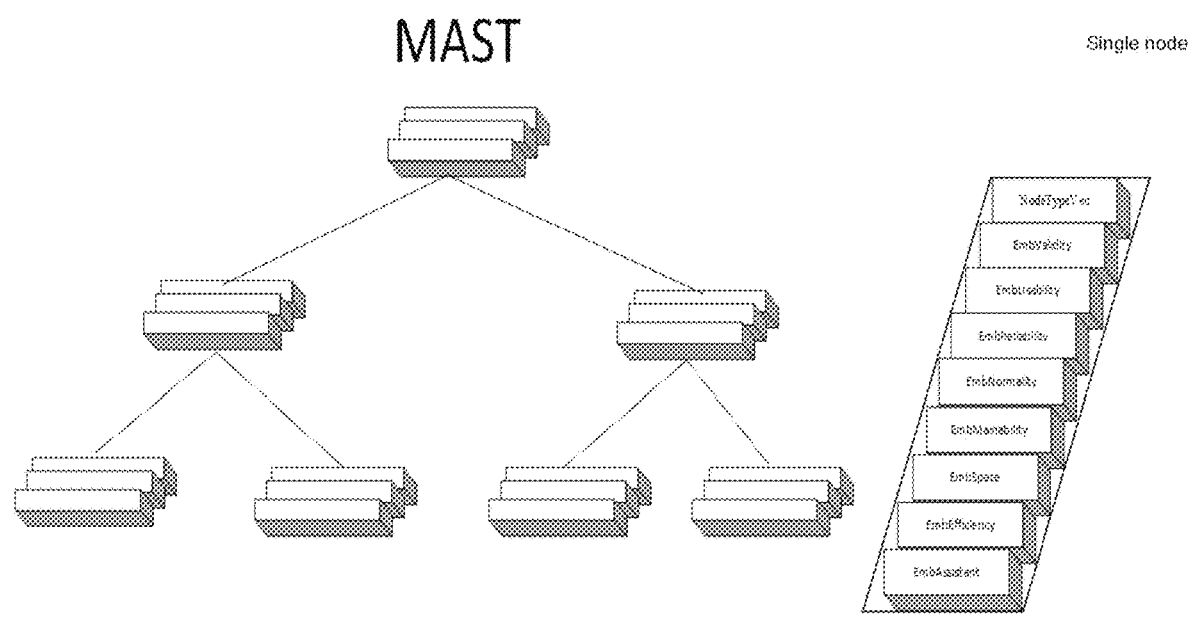
FIG. 2 is a structural schematic diagram of a multidimensional syntax tree according to an embodiment of the disclosure.

At S3.10, NodeVec is matched according to MapValue, a node sign node type vector value NodeTypeVec is generated, and according to the context of codes in the data set D, the multidimensional syntax tree based on automatic code generation quality and efficiency evaluation indicators is constructed. The schematic diagram of the constructed multidimensional syntax tree is shown in FIG. 2.

Optionally, the operation of performing feature learning on the multidimensional syntax tree by a convolutional neural network to obtain feature parameters includes that: a plurality of vector dimension feature detectors corresponding to the evaluation indicators of a plurality of dimensions are initialized, respectively; and each vector dimension feature detector is controlled to slide on the multidimensional syntax tree and output a plurality of feature parameters, the vector dimension feature detectors corresponding to the feature parameters one by one.

Specifically, the model used in the disclosure is a multi-indicator-based automatic code generation quality and efficiency evaluation parameter model generated by performing feature learning on the multidimensional syntax tree using a fully connected convolutional neural network. The model is the multi-indicator automatic code generation quality and efficiency evaluation parameter model generated by multiple convolutions of the node vector feature detector. Herein, the plurality of vector dimension feature detectors corresponding to evaluation indicators of multiple dimensions are initialized respectively, and each vector dimension feature detector is controlled to traverse each tree node in the multidimensional syntax tree and output a plurality of feature parameters, which specifically includes the following steps.

At S4.1, the multi-indicator automatic code generation quality and efficiency evaluation parameter model is loaded, specifically, loading model parameters, and S4.2 is executed.

At S4.2, the feature detectors corresponding to the code sign node type vector dimension, the validity dimension, the usability dimension, the Reliability dimension reliability dimension, the normative dimension, the maintainability dimension, the spatial efficiency dimension, the temporal efficiency dimension and the assistance dimension are initialized, which includes the specific steps as follows.

The operation of initializing the validity dimension feature detector includes:

$$W^t_{conv\_validity}, W^l_{conv\_validity}, W^r_{conv\_validity}, b_{conv\_validity}$$

where t, l, and r represent root, left and right, respectively. $W^t_{conv\_validity}$ represents a code sign node type vector dimension root node feature detector. $W^l_{conv\_validity}$ represents a code sign node type vector dimension left child node feature detector. $W^r_{conv\_validity}$ represents a code sign node type vector dimension right child node feature detector. $b_{conv\_validity}$ represents a code sign node type vector dimension feature detector bias parameter.

At S4.3, the feature detectors corresponding to the validity dimension, the usability dimension, the reliability dimension, the normative dimension, the maintainability dimension, the spatial efficiency dimension, the temporal efficiency dimension and the assistance dimension are initialized respectively according to the method of S4.2.

At S4.4, the multiple feature detectors are respectively used to slide in the multidimensional syntax tree, which includes the following specific steps.

The validity dimension validity dimension feature detector is used to slide in the multidimensional syntax tree. The validity dimension validity dimension feature detector outputs y_Validity validity dimension validity each time as follows.

The Validity dimension validity dimension feature detector is used to slide in the MAST. The Validity dimension validity dimension feature detector outputs y_Validity validity dimension validity each time as:

$$y\_validity = \tanh(\Sigma_{i=1}^{n} W_{conv\_validity,i} \text{validity}_i + b_{conv\_validity})$$

where y_validity $\in R^N_f$, $b_{conv\_validity} \in R^N_f$, and $W_{conv\_validity,i} \in R^N_f \times N_c$. y_validity represents i which indicates the ith node in the multidimensional syntax tree.

For any node in the AST node vector dimension feature detector, its weight parameter $W_{conv\_validity,j}$ is a linear combination of $W^t_{conv\_validity}, W^l_{conv\_validity}, W^r_{conv\_validity}$, $b_{conv\_validity}$, and the weight coefficients of the node feature detector are respectively $\eta\_validity^t_i$, $\eta\_validity^l_i$, and $\eta\_validity^r_i$.

$$\eta\_validity^t_i = \frac{d_i - 1}{d - 1}$$

$$\eta\_validity^l_i = (1 - \eta\_validity^t_i)(1 - \eta\_validity^r_i)$$

$$\eta\_validity^r_i = (1 - \eta\_validity^t_i)\frac{p_i - 1}{validity\_b_i - 1}$$

where $d_i$ is the position of the node i in the root node feature detector. d is the window depth. $p_i$ is the position of the node i in the right child node feature detector. validity_$b_i$ serves as the total number of sibling nodes of the usability dimension right child node feature detector $p_i$.

At S4.5, the multidimensional syntax tree is subjected to a traversing operation using the multidimensional feature detectors in consequence to obtain the corresponding feature parameters, specifically y_token, y_Validity, y_Usability, y_Reliability, y_Normality, y_Maintainability, y_Space, y_Efficiency and y_Assistant.

Optionally, the operation of inputting the feature parameters to a value evaluation parameter model, and controlling the evaluation parameter model to output an evaluation value includes that: the evaluation parameter model is controlled to output a first indicator value matrix corresponding to the quality of generating the second code, the first indicator value matrix being a matrix consisting of a plurality of indicator values corresponding to the quality of generating the second code corresponding to a plurality of codes generated by an automatic code generation tool, and the first indicator value matrix being a matrix of G rows and H columns; normalizing processing is performed on the first indicator value matrix and a generation quality indicator value corresponding to a second code column is obtained, the second code column being any code column in the generation quality indicator value matrix; the proportion of the first generation quality indicator value corresponding to the second code is calculated according to the indicator value corresponding to the quality of generating the second code; a first entropy value corresponding to the second code generation quality indicator is calculated according to the proportion of the first generation quality indicator value; a corresponding first difference coefficient of the generation quality indicator corresponding to the second code is calculated according to the first entropy value; a first weight corresponding to the generation quality indicator of the second code is calculated according to the first difference coefficient; and the first evaluation value is calculated according to the first weight.

In the above way, the features learned by the feature detectors are output by the fully connected neural network, and the G rows and H columns of automatic code generation quality and efficiency indicator values output by the fully connected neural network are expressed as a matrix M of G*H. The specific steps are to perform normalizing processing on M, and the calculation method is as follows.

$$x_{gh} = \frac{x_{gh} - \min(x_h)}{\max(x_h) - \min(x_h)}$$

where $x_{gh}$ indicates the automatic code generation quality indicator value in the gth row and the hth column in M. $\min(x_h)$ is the minimum value in the hth column of automatic code generation quality indicator values in M. $\max(x_h)$ is the maximum value in the hth column of automatic code generation quality indicator values in M, and S5.6 is executed, where g=1, 2, ... G; h=1, 2, ... H. The proportion $p_{gh}$, $$p_{gh} = \frac{x_{gh}}{\sum_1^G x_{gh}} (h = 1, 2 ..., H)$$

of the gth automatic code generation quality indicator value in the hth item of automatic code generation quality indicators in M is calculated. The entropy value $e_h$, $$e_h = -k * \sum_1^G p_{gh} * \log(p_{gh}), k = \frac{1}{\ln(G)}$$

of the hth item of automatic code generation quality indicators in M is calculated. The difference coefficient $F_n$, $F_n = 1 - e_h$ of the hth column of automatic code generation quality indicators in M is calculated. The weight $W_h$, $$W_h = \frac{F_h}{\sum_1^H F_h}$$

of the hth item of automatic code generation quality indicators in M is calculated. The gth row of automatic code generation quality evaluation values in M are calculated to be $Q_g$, $Q_g = \Sigma_1^H W_h M_{gh}$. $M_{gh}$ represents the gth row and hth column of the normalized M.

Optionally, the operation of inputting the feature parameters to an evaluation parameter model, and controlling the evaluation parameter model to output an evaluation value includes that: the evaluation parameter model is controlled to output a second indicator value matrix corresponding to the efficiency of generating the second code, the second indicator value matrix being a matrix of G rows and H columns; normalizing processing is performed on the second indicator value matrix and a generation efficiency indicator value corresponding to the second code column is obtained, the second code column being any code column in the generation efficiency indicator value matrix; the proportion of the second generation efficiency indicator value corresponding to the second code is calculated according to the indicator value of the efficiency of generating the second code; a second entropy value corresponding to the second code generation efficiency indicator is calculated according to the proportion of the second generation efficiency indicator value; a corresponding second difference coefficient of the generation efficiency indicator corresponding to the second code is calculated according to the second entropy value; a second weight corresponding to the generation efficiency indicator of the second code is calculated according to the second difference coefficient; and the second evaluation value is calculated according to the second weight.

Specifically, M is subjected to normalizing processing, and the calculation method is as follows.

$$\chi_{gh} = \frac{x_{gh} - \min(x_h)}{\max(x_h) - \min(x_h)}$$

where $x_{gh}$ indicates the automatic code generation efficiency indicator value in the gth row and hth column in M. $\min(x_h)$ is the minimum value in the hth column of automatic code) generation quality indicator values in M. $\max(x_h)$ the maximum value in the hth column of automatic code generation quality indicator values in M, and S5.6 is executed. where g=1, 2, . . . G. h=1, 2, . . . H. The proportion $P_{gh}$, $$p_{gh} = \frac{X_{gh}}{\sum_{1}^{G} x_{gh}} (h = 1, 2 \ldots, H)$$

of the gth automatic code generation efficiency indicator value in the hth item of automatic code generation efficiency indicators in M is calculated. The entropy value $e_h$, $$e_h = -k * \sum_{1}^{G} p_{gh} * \log(p_{gh}), k = \frac{1}{\ln(G)}$$

of the hth item of automatic code generation efficiency indicators in M is calculated. The difference coefficient $F_n$, $F_n=1-e_h$ of the hth column of automatic code generation efficiency indicators in M is calculated. The weight $W_h$, $$W_h = \frac{F_h}{\sum_{1}^{H} F_h}$$

of the hth item of automatic code generation efficiency indicators in M is calculated. The gth row of automatic code generation efficiency evaluation values in M are calculated to be $Q_g$, $Q_g = \sum_{1}^{H} W_h M_{gh}$. Mgh represents the gth row and hth column of the normalized M.

Optionally, the first evaluation value includes a plurality of first child evaluation values, the plurality of first child evaluation values being respectively configured to evaluate a plurality of first dimensions corresponding to the code generation quality of the code generation tool, and the plurality of first dimensions at least including the following dimensions: a validity dimension, an availability dimension, a reliability dimension, a maintainability dimension and a normative dimension. The second evaluation value includes a plurality of second child evaluation values, the plurality of second child evaluation values being respectively configured to evaluate a plurality of second dimensions corresponding to the code generation efficiency of the code generation tool, and the plurality of second dimensions at least including the following dimensions: a spatial dimension, a temporal dimension and an assistance dimension. In the application, the evaluation values for evaluating the efficiency and quality obtained based on multidimensional evaluation indicators are divided into a plurality of values, which are used to evaluate the quality of generating the second code and the efficiency of generating the second code respectively.

The embodiments of the disclosure provide a method for determining code generation quality and efficiency evaluation values based on multiple indicators. An object code is acquired, the object code including a first code input by a target object and a second code recommended by a code generation tool and determined by the target object; an interactive data set is acquired, the interactive data set including behavioral interaction data between the target object and the code generation tool; a multidimensional evaluation indicators is determined and a plurality of characteristic values corresponding to each piece of data in the interactive data set are extracted according to the multidimensional evaluation indicators, each characteristic value corresponding to the evaluation indicator of each dimension one by one, and the multidimensional evaluation indicators being configured to evaluate the quality and efficiency of generating the second code; the plurality of characteristic values corresponding to each piece of data in the interactive data set are determined as a characteristic data set; a multidimensional syntax tree is constructed according to the object code and the characteristic data set; feature learning is performed on the multidimensional syntax tree by a convolutional neural network to obtain feature parameters; and the feature parameters are input to a value evaluation parameter model, and the evaluation parameter model is controlled to output the evaluation value, the evaluation value including a first evaluation value and a second evaluation value, the first evaluation value being configured to evaluate the quality of generating the second code, and the second evaluation value being configured to evaluate the efficiency of generating the second code, which solves the technical problem that the evaluation method in the related art is to evaluate a static automatic code generation result, ignoring the influence of code changes on the evaluation result, resulting in low reliability of the evaluation result, and improves the generation efficiency of automatic code generation.

It should be noted that the steps presented in the flowchart of the drawings can be executed in a computer system like a group of computer executable instructions, and moreover, although a logical order is shown in the flow chart, in some cases, the presented or described steps can be performed in an order different from that described here.

The embodiments of the disclosure provide an apparatus for determining code generation quality and efficiency evaluation values based on multiple indicators. It should be noted that the apparatus for determining code generation quality and efficiency evaluation values based on multiple indicators can be used to execute the method for determining code generation quality and efficiency evaluation values based on multiple indicators provided by the embodiments of the disclosure. The apparatus for determining code generation quality and efficiency evaluation values based on multiple indicators provided by the embodiments of the disclosure is described in details below.

Figure 3:
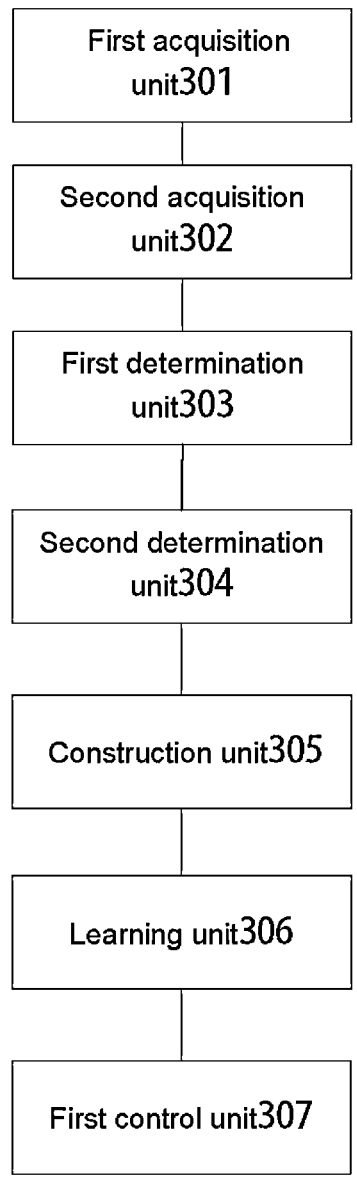
FIG. 3 is a schematic diagram of an apparatus for determining code generation quality and efficiency evaluation values based on multiple indicators according to an embodiment of the disclosure.

FIG. 3 is a schematic diagram of an apparatus for determining code generation quality and efficiency evaluation values based on multiple indicators according to an embodiment of the disclosure. As shown in FIG. 3, the apparatus includes: a first acquisition unit 301, configured to acquire an object code, the object code including a first code input by a target object and a second code recommended by a code generation tool and determined by the target object; a second acquisition unit 302, configured to acquire an interactive data set, the interactive data set including behavioral interaction data between the target object and the code generation tool; a first determination unit 303, configured to determine a multidimensional evaluation indicators and extract a plurality of characteristic values corresponding to each piece of data in the interactive data set according to the multidimensional evaluation indicators, each characteristic value corresponding to the evaluation indicator of each dimension one by one, the multidimensional evaluation indicators being configured to evaluate the quality and efficiency of generating the second code; a second determination unit 304, configured to determine the plurality of characteristic values corresponding to each piece of data in the interactive data set as a characteristic data set; a construction unit 305, configured to construct a multidimensional syntax tree according to the object code and the characteristic data set; a learning unit 306, configured to perform feature learning on the multidimensional syntax tree by a convolutional neural network to obtain feature parameters; and a first control unit 307, configured to input the feature parameters to a value evaluation parameter model, and control the evaluation parameter model to output an evaluation value, the evaluation value including a first evaluation value and a second evaluation value, the first evaluation value being configured to evaluate the quality of generating the second code, and the second evaluation value being configured to evaluate the efficiency of generating the second code.

Optionally, the second acquisition unit 302 includes: a first acquisition sub-unit, configured to acquire first behavior data of the target object in a preset time period, the first behavior data at least including the number of keystrokes of the target object in the preset time period, the time for selecting a generated code, the length of an input code, a deleted code and a determined recommended code; a second acquisition sub-unit, configured to acquire second behavior data of the code generation tool in the preset time period, the second behavior data at least including the time when the code generation tool pops up the recommended code, the number of popped recommended codes, content contained in the generated code and an index position of the generated code; and a first merging sub-unit, configured to merge the first behavior data and the second behavior data into the interactive data set.

Optionally, the first determination unit 303 includes: a first initialization sub-unit, configured to initialize a multidimensional information list corresponding to the multidimensional evaluation indicators, the multidimensional information list including a plurality of information lists configured to characterize the evaluation indicator of each dimension; an extraction sub-unit, configured to traverse each piece of data in the interactive data set, and extract the characteristic value corresponding to the evaluation indicator of each dimension in each piece of data to obtain a plurality of the characteristic values; and a storage sub-unit, configured to store the plurality of characteristic values corresponding to each piece of data into the information lists corresponding to the characteristic values.

Optionally, the extraction sub-unit includes: an extraction module, configured to extract multiple parts of content in target data respectively, the target data being any piece of data in the interactive data set; a determination module, configured to determine a sign flag corresponding to each part of content according to a target evaluation indicator and obtain a plurality of sign flags, the target evaluation indicator being an indicator corresponding to any dimension in the multidimensional evaluation indicators; and a merging module, configured to merge the plurality of sign flags into the characteristic value corresponding to the target evaluation indicator.

Optionally, the second determination unit 304 includes: a first reading sub-unit, configured to read the plurality of characteristic values in the multidimensional information list; and a second merging sub-unit, configured to merge the plurality of characteristic values into the characteristic data set.

Optionally, the apparatus includes: a judging unit, configured to judge whether the object code accords with a preset syntax rule before the multidimensional syntax tree is constructed according to the object code and the characteristic data set; and an extracting unit, configured to extract the object code into a one-dimensional syntax tree in the case that the object code accords with the preset syntax rule.

Optionally, the construction unit 305 includes: a second reading sub-unit, configured to read the characteristic data set and a preset coded value table; a coding sub-unit, configured to code the characteristic data set according to the preset coded value table to obtain a plurality of coded values; a third reading sub-unit, configured to read a plurality of characteristic flag vectors corresponding to the plurality of coded values according to the plurality of coded values and a first preset vector value form, the coded values being obtained from data in a large number of the characteristic data sets, and the coded values being input to a CBOW neural network model, vector values corresponding to the coded values being output by the CBOW neural network model, and the first preset vector value form being formed according to the vector values; a fourth reading sub-unit, configured to acquire a plurality of sign nodes in the one-dimensional syntax tree, and read a plurality of sign node vector values corresponding to the sign nodes according to the plurality of sign nodes and a second preset vector value form, sign values being coded by a large number of sign node values to obtain the coded values, the coded values being input to the CBOW neural network model to output the vector values corresponding to the coded values, the second preset vector value form being formed according to the vector values, and each sign value corresponding to one vector value; and a combination sub-unit, configured to combine the plurality of characteristic flag vectors and the plurality of sign node vector values to construct the multidimensional syntax tree.

Optionally, the learning unit 306 includes: a second initialization sub-unit, configured to initialize a plurality of vector dimension feature detectors corresponding to the evaluation indicators of a plurality of dimensions, respectively; and a first control sub-unit, configured to control each vector dimension feature detector to slide on the multidimensional syntax tree and output a plurality of feature parameters, the vector dimension feature detectors corresponding to the feature parameters one by one.

Optionally, the first control unit 307 includes: a second control sub-unit, configured to control the evaluation parameter model to output a first indicator value matrix corresponding to the quality of generating the second code, the first indicator value matrix being a matrix consisting of a plurality of indicator values corresponding to the quality of generating the second code corresponding to a plurality of codes generated by an automatic code generation tool, and the first indicator value matrix being a matrix of G rows and H columns; a processing sub-unit, configured to perform normalizing processing on the first indicator value matrix and obtain a generation quality indicator value corresponding to a second code column, the second code column being any code column in the generation quality indicator value matrix; a first calculation sub-unit, configured to calculate the proportion of the first generation quality indicator value corresponding to the second code according to the indicator value corresponding to the quality of generating the second code; a second calculation sub-unit, configured to calculate a first entropy value corresponding to the second code generation quality indicator according to the proportion of the first generation quality indicator value; a third calculation sub-unit, configured to calculate a corresponding first difference coefficient of the generation quality indicator corresponding to the second code according to the first entropy value; a fourth calculation sub-unit, configured to calculate a first weight corresponding to the generation quality indicator of the second code according to the first difference coefficient; and a fifth calculation sub-unit, configured to calculate the first evaluation value according to the first weight.

Optionally, the first control unit 307 includes: a third control sub-unit, configured to control the evaluation parameter model to output a second indicator value matrix corresponding to the efficiency of generating the second code, the second indicator value matrix being a matrix of G rows and H columns; a normalization sub-unit, configured to perform normalizing processing on the second indicator value matrix and obtain a generation efficiency indicator value corresponding to the second code column, the second code column being any code column in the generation efficiency indicator value matrix, and the second object code column being generated by the code generation tool; a sixth calculation sub-unit, configured to calculate the proportion of the second generation efficiency indicator value corresponding to the second code according to the indicator value of the efficiency of generating the second code; a seventh calculation sub-unit, configured to calculate a second entropy value corresponding to the second code generation efficiency indicator according to the proportion of the second generation efficiency indicator value; an eighth calculation sub-unit, configured to calculate a corresponding second difference coefficient of the generation efficiency indicator corresponding to the second code according to the second entropy value; a ninth calculation sub-unit, configured to calculate a second weight corresponding to the generation efficiency indicator of the second code according to the second difference coefficient; and a tenth calculation sub-unit, configured to calculate the second evaluation value according to the second weight.

Optionally, the first evaluation value includes a plurality of first child evaluation values, the plurality of first child evaluation values being respectively configured to evaluate a plurality of first dimensions corresponding to the code generation quality of the code generation tool, and the plurality of first dimensions at least including the following dimensions: a validity dimension, an availability dimension, a reliability dimension, a maintainability dimension and a normative dimension. The second evaluation value includes a plurality of second child evaluation values, the plurality of second child evaluation values being respectively configured to evaluate a plurality of second dimensions corresponding to the code generation efficiency of the code generation tool, and the plurality of second dimensions at least including the following dimensions: a spatial dimension, a temporal dimension and an assistance dimension.

According to the apparatus for determining code generation quality and efficiency evaluation values based on multiple indicators provided by the embodiments of the disclosure, the first acquisition unit 301 is configured to acquire the object code, the object code including the first code input by the target object and the second code recommended by the code generation tool and determined by the target object; the second acquisition unit 302 is configured to acquire the interactive data set, the interactive data set including the behavioral interaction data between the target object and the code generation tool; the first determination unit 303 is configured to determine the multidimensional evaluation indicators and extract a plurality of characteristic values corresponding to each piece of data in the interactive data set according to the multidimensional evaluation indicators, each characteristic value corresponding to the evaluation indicator of each dimension one by one, the multidimensional evaluation indicators being configured to evaluate the quality and efficiency of generating the second code; the second determination unit 304 is configured to determine the plurality of characteristic values corresponding to each piece of data in the interactive data set as the characteristic data set; the construction unit 305 is configured to construct a multidimensional syntax tree according to the object code and the characteristic data set; the learning unit 306 is configured to perform feature learning on the multidimensional syntax tree by a convolutional neural network to obtain feature parameters; and the first control unit 307 is configured to input the feature parameters to a value evaluation parameter model, and control the evaluation parameter model to output an evaluation value, the evaluation value including a first evaluation value and a second evaluation value, the first evaluation value being configured to evaluate the quality of generating the second code, and the second evaluation value being configured to evaluate the efficiency of generating the second code, which solves the technical problem that the evaluation method in the related art is to evaluate a static automatic code generation result, ignoring the influence of code changes on the evaluation result, resulting in low reliability of the evaluation result, and improves the generation efficiency of automatic code generation.

An apparatus for determining code generation quality and efficiency evaluation values based on multiple indicators includes a processor and a memory. The above-mentioned first acquisition unit 301 and the like are stored in the memory as program units, and the above-mentioned program units stored in the memory are executed by the processor so as to implement the corresponding function.

The processor includes a kernel, which can call the corresponding program unit in the memory. One or more kernels can be set, and it can be possible to solve the technical problem that the evaluation method in the related art is to evaluate a static automatic code generation result, ignoring the influence of code changes on the evaluation result, resulting in low reliability of the evaluation result through adjusting the kernel parameters.

The memory can include forms of a volatile memory in a computer-readable medium, a Random Access Memory (RAM) and/or a volatile memory and the like, such as a Read-Only Memory (ROM) or a flash RAM, and the memory includes at least one storage chip.

The embodiments of the disclosure provide a storage medium, which stores a program thereon. When executed by a processor, the program implements the method for determining code generation quality and efficiency evaluation values based on multiple indicators.

The embodiments of the disclosure provide a processor, which is configured to run a program. When running, the program executes the method for determining code generation quality and efficiency evaluation values based on multiple indicators.

The embodiments of the disclosure provide a device, which includes a processor, a memory and a program stored on the memory and being capable of running on the processor. When the processor executes the program, the method for determining code generation quality and efficiency evaluation values based on multiple indicators is implemented. The device herein can be a server, a Personal Computer (PC), a PAD, a mobile phone, etc.

The disclosure further provides a computer program product, which is suitable for executing a program of initializing the steps in the method for determining code generation quality and efficiency evaluation values based on multiple indicators.

Those skilled in the art can understand that the embodiments of the disclosure can be provided as methods, systems, or computer program products. Therefore, the disclosure can adopt forms of complete hardware embodiments, complete software embodiments or embodiments integrating software and hardware. Moreover, the disclosure can adopt the form of a computer program product implemented on one or more computer available storage media (including but not limited to a disk memory, a Compact Disc Read Only Memory (CD-ROM), an optical memory, etc.) containing computer available program codes.

The disclosure is described with reference to flowcharts and/or block diagrams of the method, the device (system) and the computer program product according to the embodiments of the disclosure. It should be understood that each flow and/or block in the flowchart and/or block diagram, and the combination of the flow and/or block in the flowchart and/or block diagram can be implemented by the computer program instructions. These computer program instructions can be provided to a processor of a general-purpose computer, a special-purpose computer, an embedded processor or other programmable data processing devices to generate a machine, so that instructions which are executed by the processor of the computer or other programmable data processing devices generate a device which is used for implementing the specified functions in one or more flows of the flowchart and/or one or more blocks of the block diagram.

These computer program instructions can also be stored in the computer-readable memory which can guide the computer or other programmable data processing devices to work in a particular way, so that the instructions stored in the computer-readable memory generate a product including an instruction device. The instruction device implements the specified functions in one or more flows of the flowchart and/or one or more blocks of the block diagram.

These computer program instructions can also be loaded on the computer or other programmable data processing devices, so that a series of operation steps are performed on the computer or other programmable data processing devices to generate the processing implemented by the computer, and the instructions executed on the computer or other programmable data processing devices provide the steps for implementing the specified functions in one or more flows of the flowchart and/or one or more blocks of the block diagram.

In a typical configuration, a computing device includes one or more than one Central Processing Unit (CPU), input/output interface, network interface, and memory.

The memory can include a volatile memory, a RAM and/or a nonvolatile memory, and other forms in computer readable media, for example, a ROM or a flash RAM. The memory is an example of the computer readable media.

The computer readable media include permanent and non-permanent, movable and non-movable media that can realize information storage by a variety of ways or technologies. The information can be computer-readable instructions, data structures, modules of a program, or other data. Examples of the computer storage media include, but not limited to: a Phase-Change Memory (PRAM), a Static Random Access Memory (SRAM), a Dynamic Random Access Memory (DRAM), other types of RAM, ROM, and Electrically Erasable Programmable Read-Only Memory (EEPROM), a flash memory or other memory technologies, a CD-ROM, a Digital Video Disk (DVD) or other optical memories and magnetic cassette tapes, magnetic tape disk storage or other magnetic storage devices or a variety of other non-transmission media, which can be configured to store information that can be accessed by the computing device. As defined in the specification, the computer readable media do not include computer-readable transitory media, such as modulated data signals and carriers.

It should be noted that terms "include" and "contain" or any other variant are intended to cover nonexclusive inclusions herein, so that a process, method, goods or device including a series of elements not only includes those elements but also includes other elements which are not clearly listed or further includes elements intrinsic to the process, the method, the goods or the device. Under the condition of no more limitations, an element defined by the statement "including a/an . . . " does not exclude existence of the same other elements in a process, method, goods or device including the element.

Those skilled in the art can understand that embodiments of the disclosure can be provided as methods, systems, or computer program products. Therefore, the disclosure can adopt forms of complete hardware embodiments, complete software embodiments or embodiments integrating software and hardware. Moreover, the disclosure can adopt the form of a computer program product implemented on one or more computer available storage media (including but not limited to a disk memory, a CD-ROM, an optical memory, etc.) containing computer available program codes.

The above is only preferred embodiments of the disclosure and is not intended to limit the disclosure. Those skilled in the art can make various modifications and variations. Any modifications, equivalent replacements, improvements and the like made within the spirit and principle of the disclosure shall fall within the scope of protection of the disclosure.

What is claimed is:

1. A method for determining code generation quality and efficiency evaluation values based on multiple indicators, comprising:

acquiring an object code, the object code comprising a first code input by a target object and a second code recommended by a code generation tool and determined by the target object;

acquiring an interactive data set, the interactive data set comprising behavioral interaction data between the target object and the code generation tool;

determining multidimensional evaluation indicators and extracting a plurality of characteristic values corresponding to each piece of data in the interactive data set according to the multidimensional evaluation indicators, wherein each characteristic value corresponds to an evaluation indicator of the each dimension one by one, the multidimensional evaluation indicators being configured to evaluate quality of generating the second code and efficiency of generating the second code;

determining the plurality of the characteristic values corresponding to each piece of the data in the interactive data set as a characteristic data set;

constructing a multidimensional syntax tree according to the object code and the characteristic data set;

performing feature learning on the multidimensional syntax tree by a convolutional neural network to obtain feature parameters; and inputting the feature parameters to a value evaluation parameter model, and controlling the evaluation parameter model to output evaluation value, wherein the evaluation value comprises a first evaluation value and a second evaluation value, the first evaluation value being configured to evaluate the quality of generating the second code, and the second evaluation value being configured to evaluate the efficiency of generating the second code.

2. The method of claim 1, wherein acquiring the interactive data set comprises:

acquiring first behavior data of the target object in a preset time period, the first behavior data at least comprising a number of keystrokes of the target object in the preset time period, a time it takes to select and generate code, a length of an input code, a deleted code and a recommended code which is determined;

acquiring second behavior data of the code generation tool in the preset time period, the second behavior data at least comprising a time when the code generation tool pops up the recommended code, a number of popped recommended codes, content contained in the generated code and an index position of the generated code; and merging the first behavior data and the second behavior data into the interactive data set.

3. The method of claim 1, wherein determining the multidimensional evaluation indicators and extracting the plurality of the characteristic values that corresponding to each piece of the data in the interactive data set according to the multidimensional evaluation indicators comprises:

initializing a multidimensional information list that corresponding to the multidimensional evaluation indicators, the multidimensional information list comprising a plurality of information lists that are configured to characterize the evaluation indicator of the each dimension;

traversing each piece of the data in the interactive data set, and extracting the characteristic value that corresponding to the evaluation indicator of the each dimension in each piece of the data to obtain a plurality of the characteristic values; and storing the plurality of the characteristic values corresponding to each piece of the data into the information lists corresponding to the characteristic values.

4. The method of claim 3, wherein traversing each piece of the data in the interactive data set, and extracting the characteristic value corresponding to the evaluation indicator of the each dimension in each piece of the data to obtain the plurality of the characteristic values comprises:

extracting multiple parts of content in target data respectively, the target data being any piece of the data in the interactive data set;

determining a sign flag corresponding to each part of content according to a target evaluation indicator and obtaining a plurality of sign flags, the target evaluation indicator being an indicator corresponding to any dimension in the multidimensional evaluation indicators; and merging the plurality of the sign flags into the characteristic value corresponding to the target evaluation indicator.

5. The method of claim 3, wherein determining the plurality of the characteristic values corresponding to each piece of the data in the interactive data set as the characteristic data set comprises:

reading the plurality of the characteristic values stored in the multidimensional information list; and merging the plurality of the characteristic values into the characteristic data set.

6. The method of claim 1, before constructing the multidimensional syntax tree according to the object code and the characteristic data set, further comprising:

judging whether the object code conforms to a preset syntax rule; and abstracting, in a case that the object code conforms to the preset syntax rule, the object code into a one-dimensional syntax tree.

7. The method of claim 6, wherein constructing the multidimensional syntax tree according to the object code and the characteristic data set comprises:

reading the characteristic data set and a preset coded value table;

coding the characteristic data set according to the preset coded value table to obtain a plurality of coded values;

reading a plurality of characteristic flag vectors according to the plurality of the coded values and a first preset vector value form, the coded values being obtained from data in a large number of characteristic data sets, and the coded values being input to a Continuous Bag-Of-Words (CBOW) neural network model, vector values corresponding to the coded values being output by the CBOW neural network model, and the first preset vector value form being formed according to the vector values;

acquiring a plurality of sign nodes in the one-dimensional syntax tree, and reading a plurality of sign node vector values corresponding to the sign nodes according to the plurality of the sign nodes and a second preset vector value form, sign values being coded by a large number of sign node values to obtain the coded values, the coded values being input to the CBOW neural network model to output the vector values corresponding to the coded values, the second preset vector value form being formed according to the vector values, and each sign value corresponding to one vector value; and combining the plurality of the characteristic flag vectors and the plurality of the sign node vector values to construct the multidimensional syntax tree.

8. The method of claim 1, wherein performing the feature learning on the multidimensional syntax tree by the convolutional neural network to obtain the feature parameters comprises:

initializing a plurality of vector dimension feature detectors corresponding to evaluation indicators of a plurality of the dimensions, respectively; and controlling each vector dimension feature detector to slide on the multidimensional syntax tree and output a plurality of the feature parameters, the vector dimension feature detector corresponding to the feature parameter one by one.

9. The method of claim 1, wherein inputting the feature parameters to the value evaluation parameter model, and controlling the evaluation parameter model to output the evaluation value comprises:
controlling the evaluation parameter model to output a first indicator value matrix corresponding to the quality of generating the second code, the first indicator value matrix being a matrix consisting of a plurality of indicator values corresponding to the quality of generating the second code corresponding to a plurality of codes generated by the automatic code generation tool, and the first indicator value matrix being a matrix of G rows and H columns;
performing normalized processing on the first indicator value matrix and obtaining a generation quality indicator value corresponding to a second code column, the second code column being any code column in the generation quality indicator value matrix;
calculating, according to the indicator value correspond to the quality of generating the second code, a proportion of the first generation quality indicator value corresponding to the second code;
calculating, according to the proportion of the first generation quality indicator value, a first entropy value corresponding to the second code generation quality indicator;
calculating, according to the first entropy value, a corresponding first difference coefficient correspond to the generation quality indicator corresponding to the second code;
calculating, according to the first difference coefficient, a first weight corresponding to the generation quality indicator of the second code; and
calculating, according to the first weight, the first evaluation value.

10. The method of claim 1, wherein inputting the feature parameters to the evaluation parameter model, and controlling the evaluation parameter model to output the evaluation value comprises:
controlling the evaluation parameter model to output a second indicator value matrix corresponding to the efficiency of generating the second code, the second indicator value matrix being a matrix of G rows and H columns;
performing normalized processing on the second indicator value matrix and obtaining a generation efficiency indicator value corresponding to the second code column, the second code column being any code column in the generation efficiency indicator value matrix;
calculating, according to the indicator value of the efficiency of generating the second code, a proportion of the second generation efficiency indicator value corresponding to the second code;
calculating, according to the proportion of the second generation efficiency indicator value, a second entropy value corresponding to the second code generation efficiency indicator;
calculating, according to the second entropy value, a second difference coefficient of the generation efficiency indicator corresponding to the second code;
calculating, according to the second difference coefficient, a second weight corresponding to the generation efficiency indicator of the second code; and
calculating, according to the second weight, the second evaluation value.

11. The method of claim 1, comprising:
the first evaluation value comprising a plurality of first child evaluation values, the plurality of the first child evaluation values being respectively configured to evaluate a plurality of first dimensions corresponding to the quality of the code generation tool, and the plurality of first dimensions at least comprising following dimensions: a validity dimension, an availability dimension, a reliability dimension, a maintainability dimension and a normative dimension;
the second evaluation value comprising a plurality of second child evaluation values, the plurality of the second child evaluation values being respectively configured to evaluate a plurality of second dimensions corresponding to the efficiency of the code generation tool, and the plurality of second dimensions at least comprising following dimensions: a spatial dimension, a temporal dimension and an assistance dimension.

12. An apparatus for determining code generation quality and efficiency evaluation values based on multiple indicators, comprising: a central processing unit (CPU); a memory; computer executable instruction stored in the memory which when executed by the CPU comprising:
a first acquisition unit, configured to acquire an object code, the object code comprising a first code input by a target object and a second code recommended by a code generation tool and determined by the target object;
a second acquisition unit, configured to acquire an interactive data set, the interactive data set comprising behavioral interaction data between the target object and the code generation tool;
a first determination unit, configured to determine a multidimensional evaluation indicators and extract a plurality of characteristic values corresponding to each piece of data in the interactive data set according to multidimensional evaluation indicators, wherein each characteristic value corresponds to evaluation indicator of each dimension one by one, the multidimensional evaluation indicators being configured to evaluate quality of generating the second code and efficiency of generating the second code;
a second determination unit, configured to determine the plurality of the characteristic values corresponding to each piece of the data in the interactive data set as a characteristic data set;
a construction unit, configured to construct a multidimensional syntax tree according to the object code and the characteristic data set;
a learning unit, configured to perform feature learning on the multidimensional syntax tree by a convolutional neural network to obtain feature parameters; and
a first control unit, configured to input the feature parameters to a value evaluation parameter model, and control the evaluation parameter model to output an evaluation value, wherein the evaluation value comprises a first evaluation value and a second evaluation value, the first evaluation value being configured to evaluate the quality of generating the second code, and the second evaluation value being configured to evaluate the efficiency of generating the second code.

13. A computer-readable storage memory, the computer-readable storage memory comprising a stored program, wherein when the program runs, a device where a computer-readable storage memory is located is controlled to caused to:
acquire an object code, the object code comprising a first code input by a target object and a second code recommended by a code generation tool and determined by the target object;

acquire an interactive data set, the interactive data set comprising behavioral interaction data between the target object and the code generation tool;

determine multidimensional evaluation indicators and extract a plurality of characteristic values corresponding to each piece of data in the interactive data set according to the multidimensional evaluation indicators, wherein each characteristic value corresponds to an evaluation indicator of the each dimension one by one, the multidimensional evaluation indicators being configured to evaluate quality of generating the second code and efficiency of generating the second code;

determine the plurality of the characteristic values corresponding to each piece of the data in the interactive data set as a characteristic data set;

construct a multidimensional syntax tree according to the object code and the characteristic data set;

perform feature learning on the multidimensional syntax tree by a convolutional neural network to obtain feature parameters; and input the feature parameters to a value evaluation parameter model, and control the evaluation parameter model to output evaluation value, wherein the evaluation value comprises a first evaluation value and a second evaluation value, the first evaluation value being configured to evaluate the quality of generating the second code, and the second evaluation value being configured to evaluate the efficiency of generating the second code.

* * * * *